US006998088B2

(12) United States Patent
Beers et al.

(10) Patent No.: US 6,998,088 B2
(45) Date of Patent: Feb. 14, 2006

(54) SELF-RELEASING CURING BLADDER CONTAINING A MICRO-ENCAPSULATED LUBRICANT AND USE THEREOF TO CURE RUBBER PRODUCTS SUCH AS TIRES

(75) Inventors: Roger Neil Beers, Uniontown, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 263 days.

(21) Appl. No.: 10/719,271

(22) Filed: Nov. 21, 2003

(65) Prior Publication Data

US 2005/0112223 A1 May 26, 2005

(51) Int. Cl.
*B29C 35/02* (2006.01)
*B29D 30/00* (2006.01)

(52) U.S. Cl. .......................... 264/315; 425/43; 425/52

(58) Field of Classification Search .................. 425/43, 425/52; 264/315, 326; 249/65; 156/401
See application file for complete search history.

(56) References Cited

U.S. PATENT DOCUMENTS

| 3,031,423 | A | | 4/1962 | Meier | |
|---|---|---|---|---|---|
| 4,814,214 | A | * | 3/1989 | Tomita et al. | 264/315 |
| 5,538,218 | A | | 7/1996 | Patitsas et al. | 249/65 |
| 5,580,513 | A | | 12/1996 | Patitsas et al. | 264/501 |
| 5,728,311 | A | | 3/1998 | Patitsas et al. | 249/65 |
| 6,015,525 | A | * | 1/2000 | Patitsas et al. | 264/315 |
| 6,231,026 | B1 | * | 5/2001 | Patitsas et al. | 249/65 |
| 6,846,444 | B1 | * | 1/2005 | Beers et al. | 264/315 |

FOREIGN PATENT DOCUMENTS

JP 61-254633 * 11/1986

* cited by examiner

*Primary Examiner*—James P. Mackey
(74) *Attorney, Agent, or Firm*—Henry C. Young, Jr.

(57) ABSTRACT

This invention relates to an expandable curing bladder of a butyl rubber composition containing a micro-encapsulated polysiloxane lubricant for delivering lubricity to the surface of the bladder. The invention further relates to a process of curing tires with such bladder.

19 Claims, No Drawings

US 6,998,088 B2

SELF-RELEASING CURING BLADDER CONTAINING A MICRO-ENCAPSULATED LUBRICANT AND USE THEREOF TO CURE RUBBER PRODUCTS SUCH AS TIRES

FIELD OF THE INVENTION

This invention relates to an expandable curing bladder of a butyl rubber composition containing a micro-encapsulated polysiloxane lubricant for delivering lubricity to the surface of the bladder. The invention further relates to a process of curing tires with such bladder.

BACKGROUND OF THE INVENTION

Pneumatic tires are conventionally manufactured by use of an expandable butyl rubber based bladder. For example, a green, uncured, tire is placed in a tire curing mold where the tire is cured, or vulcanized, under conditions of elevated temperature and pressure. In the mold, the open toroidal shaped tire is pressed out against the mold by an expandable butyl rubber based bladder via internal pressure administered to the bladder such by steam, etc. Such tire manufacture and use of expandable butyl rubber bladders for such purpose is well known to those having skill in such art.

It is important for the interfacial surface of the expandable tire curing bladder of a butyl rubber composition to have adequate interfacial lubricity and sufficiently low adhesion properties between the bladder surface and the inner surface of the tire being vulcanized in the mold.

Conventionally, the butyl rubber composition for a tire curing bladder contains castor oil as an internal lubricant which is intended to bleed (migrate) to the outer surface of the bladder to promote a continuing lubricity at the interface between the bladder surface and inner surface of the tire being cured. For example, see U.S. Pat. No. 3,031,423.

Use of corn oil as an internal tire cure butyl rubber bladder lubricant for a similar purpose has also been proposed. See U.S. Pat. No. 5,580,513.

Graphite as a lubricant (see U.S. Pat. No. 5,538,218) and polytetrafluoroethylene powder as a lubricant (see U.S. Pat. No. 5,728,311) have also been proposed for use in a butyl rubber tire curing bladder.

Even with an internal lubricant (a lubricant contained in the butyl rubber composition designed to bleed to the surface of the bladder) such as castor oil or corn oil, it is often desired to externally apply a polysiloxane based lubricant to the outer bladder surface as to enhance the interfacial lubrication between the bladder and tire surfaces, a practice which is well known to those skilled in such art.

Thus, from an historical perspective, pneumatic rubber vehicle tires are produced by molding and curing green (uncured) and unshaped tires in a molding press. The green tire is pressed outwardly against a mold surface by means of an inner fluid-expandable bladder. By this method, the green tire is shaped against the outer mold surface which defines the tire tread pattern and configuration of the sidewalls. By application of heat (elevated temperature) and pressure, the tire is molded and cured.

Historically, the expansion of the bladder is accomplished by application of internal pressure to the inner bladder cavity. The pressure is provided by a fluid such as gas, hot water and/or steam, which also participates in the transfer of heat for the curing or vulcanization of the tire. The tire is then conventionally allowed to cool somewhat in the mold, sometimes aided by adding cold or cooler water to the bladder. Then the mold is opened, the bladder is collapsed by removal of its internal fluid pressure and the tire is removed from the tire mold. Such use of tire curing bladders is well known to those having skill in such art.

By such practice, it is recognized that there is substantial relative movement at the interface between the outer contacting surface of the bladder and the inner surface of the tire during the expansion phase of the bladder. Likewise, there is considerable relative movement between the outer contacting surface of the bladder and the cured inner surface of the tire during the collapse and the stripping of the bladder from the tire after the tire has been molded and vulcanized.

By such practice, it is recognized that the bladder surface can tend to stick to a tire's inner surface after the tire is cured and during the bladder collapsing part of the tire cure cycle. This adhesion may cause roughening of the bladder surface if it is not controlled. This typically reduces bladder durability and can produce defective tires.

Accordingly, it is often desired to pre-coat the bladder surface, and/or to pre-coat the inner surface of the green tires with a lubricant which can also transfer to the bladder surface and, thereby, provide a degree of interfacial lubricity between the outer bladder surface and inner tire surfaces during the tire's molding and curing operation. Such externally applied lubricant has sometimes been referred to as a "bladder lubricant", and can be of numerous formulations. A silicone polymer (e.g., a lubricant comprised of a polysiloxane such as for example a polydimethylsiloxane) is often used as an externally applied bladder lubricant.

It is to be appreciated that the release of the tire from its curing bladder in an industrial manufacturing setting is intimately associated with both the phenomenon of release (to prevent sticking) and the phenomenon of lubrication (to enhance slipping) between the bladder surface and the inner tire surface. The release aspect refers to the basic ability to avoid adhesion, or enhance release, between the bladder surface and inner tire surface and the aspect of lubrication relates to enhancing the ability of the surfaces to slip and enable a movement of the bladder with respect to the tire as the tire is shaped within the mold.

Expandable tire curing bladders are commonly of a butyl rubber composition. Butyl rubber is a copolymer of predominantly isobutylene with small amounts of diene monomers, usually isoprene, to give sufficient unsaturation to allow the butyl rubber to be crosslinked. Halogenated copolymers of isobutylene and para-methylstyrene are also sometimes used such as for example, chlorobutyl rubber and bromobutyl rubber and brominated copolymers of ethylene and paramethyl styrene. Accordingly, it is desired to provide expandable butyl rubber curing bladders with acceptable lubricity and decreased adhesion of the bladder to the tire surface against which the bladder expands.

In the description of this invention, the term "phr" is sometimes used to refer to "parts by weight of an ingredient per hundred parts by weight of rubber" for various ingredients in a rubber composition.

The terms "compound", "compounded rubber" and "rubber composition" are intended to be interchangeable terms unless otherwise indicated. The terms "cure" arid "vulcanize" are intended to be interchangeable terms unless otherwise indicated. The terms "green" and "uncured" are intended to be interchangeable unless otherwise indicated.

SUMMARY AND PRACTICE OF THE INVENTION

The present invention provides an expandable curing bladder (for shaping and curing rubber products including tires) of a rubber composition comprising a resin cured isobutylene copolymer rubber which contains a micro-encapsulated lubricant. The inclusion of a dispersion of the micro-encapsulated lubricant, such as a polysiloxane-based lubricant, in the bladder rubber composition is designed to provide a delivery of the lubricant to the bladder surface as it is released from its micro-capsules over time, caused by the bladder being worked, to migrate to the surface of the bladder. The micro-capsules of the lubricant are envisioned as being in a form of very small thin walled shells of an organic polymer which contain (micro-encapsulate) the lubricant and which are dispersed within the bladder's butyl rubber-based composition. Such shells are envisioned as having an average diameter in a range of from about 1 to about 500 microns, alternatively from about 5 to about 150 microns, although they may not necessarily be in a perfect spherical shape. It is envisioned that the walls of such shells rupture over time, melt or otherwise blend with the rubber composition, or allow the lubricant to diffuse through the shell wall, to thereby release the lubricant into the butyl rubber composition upon the repeated expansion and contraction of the bladder under elevated temperature conditions such as, for example, in a range of from about 140° C. to about 180° C.

The quantity of the polysiloxane-based lubricant in the micro-encapsulated form is envisioned as being present, for example, in an amount ranging from about 0.5 to about 40 parts by weight per 100 parts by weight of the butyl rubber (phr). The bladder's butyl rubber composition may also contain graphite and/or a fluorinated ethylene polymer, for example polytetrafluoroethylene as well as castor oil, corn oil and/or ultrahigh molecular weight polyethylene (UHMWPE).

The present invention further comprises a curing press (e.g. tire curing press) comprised of a mold which contains said expandable curing bladder to assist in shaping and curing an uncured rubber product (e.g. an uncured toroidally shaped pneumatic rubber tire).

The present invention additionally provides a process of using said curing bladder to shape and cure an uncured toroidally shaped pneumatic tire.

DETAILED DESCRIPTION

In accordance with this invention, an expandable curing bladder for rubber products (e.g. tires), particularly rubber products of diene-based elastomers, is composed of a rubber composition comprised of, based on parts weight per 100 parts by weight rubber (phr):

(A) an isobutylene copolymer rubber selected from butyl rubber and/or halobutyl rubber, and (B) about 2 to about 40 phr of a dispersion contained therein of micro-capsules comprised of a micro-encapsulated polysiloxane-based lubricant;

wherein said butyl rubber is comprised of a copolymer of isobutylene and isoprene which contains from about 0.5 to about 5 weight percent units derived from isoprene;

wherein said halobutyl rubber is a halogenated butyl rubber which is comprised of a chlorinated or brominated copolymer of isobutylene and isoprene which contains from about 0.5 to about 5, alternately from about 1 to about 5, weight percent units derived from isoprene (sometimes referred to as chlorobutyl or bromobutyl rubber, respectively); and wherein said micro-capsules are comprised of said polysiloxane-based lubricant micro-encapsulated within a thin walled shell of an organic polymer.

In practice, said polysiloxane lubricant is typically a polyalkylsiloxane such as, for example, a poly(dimethylsiloxane).

As hereinbefore discussed, the present invention is further directed to a curing press for curing an uncured toroidally shaped pneumatic rubber tire which contains said expandable curing bladder to assist shaping and curing said pneumatic tire.

As hereinbefore discussed, the present invention is additionally directed to a process of using said expandable curing bladder to shape and cure a pneumatic tire which comprises:

(A) inserting an uncured toroidally shaped pneumatic rubber tire into a curing mold having said expandable curing bladder positioned therein;

(B) closing said curing mold and inflating said expandable curing bladder to expand said expandable curing bladder outwardly against an inner surface of said uncured pneumatic rubber tire to force said uncured pneumatic tire against a mold surface of said curing mold;

(C) curing said uncured pneumatic rubber tire in said curing mold at an elevated temperature in a range of about 140° C. to about 180° C.;

(D) deflating said expandable curing bladder; and (E) removing the resultant cured pneumatic rubber tire from the curing mold and expandable curing bladder.

In practice, as also hereinbefore discussed, said thin walled shells are envisioned as having an average diameter in a range of from about 1 to about 500 microns, alternatively from about 5 to about 150 microns, although it is understood that they are not expected to be in an exact or perfect spherical shape.

In practice, said thin walls of said shells may be comprised of an organic polymer such as, for example, a polyamide, polyester, polyurethane or polyurea based composition, preferably of a polyamide or polyester based composition.

In practice, said polyamide for said thin walled shell may be, for example, a polymerization product of a diamine and diacid chloride (e.g. nylon).

In practice, said polyester for said thin walled shell may be, for example, a polymerization product of a bisphenol and diacid chloride.

In practice, said polyurethane for said thin walled shell may be, for example, a polymerization product of a bisphenol and diisocyanate.

In practice, said polyurea for said thin walled shell may be, for example, a polymerization product of a polyamine and a diiocyanate.

In practice, the resin cured butyl rubber for the expandable bladder is cured with at least one curative including from about 0.5 to about 12 phr of a halogenated or non-halogenated phenolic resin curative for crosslinking the isobutylene copolymer rubber (the butyl rubber or halobutyl rubber). The curative is not a sulfur-based curative. Cure bladders for diene-based rubber products (e.g. tires) do not contain sulfur curatives so that curing is not thereby promoted between the surface of the rubber product and the bladder as would be understood by one having skill in the pertinent art.

In an exemplary embodiment, the curative is a combination of polychloroprene rubber and phenol-formaldehyde resin.

In practice, said bladder rubber composition may also contain about 2 to about 8 phr of at least one of castor oil, corn oil and soya-bean oil and may also contain a paraffinic oil.

In practice, said bladder rubber composition may also contain about 0.1 to about 30 phr of graphite and/or polytetrafluoroethylene powder.

In practice, said bladder rubber composition may also contain about 1 to about 15 phr of an ultra high molecular weight polyethylene (UHMWPE).

Such UHMWPE may, for example, have a melting point in the range of about 125° C. to about 140° C., (according to ISO 1628, Part 3), and a viscosity average molecular weight in the range of about 2 to about 20 million g/mol, (according to ISO 3146 Method C).

The addition of micro-encapsulated lubricant to the bladder rubber composition is envisioned herein to provide a lubricity to the surface of the curing bladder to thereby lower adhesion of the uncured tire surface to curing bladder surface. Consequently, it is envisioned that the amount of lubricant externally sprayed on the bladder surface and/or inner surface of the uncured tire may be reduced or even eliminated, thereby simplifying a portion of the tire curing process.

In one aspect of the invention, it is envisioned that the encapsulated lubricant is gradually released from its micro-encapsulation, namely from its micro-encapsulation shell, by, for example, the shell wall being ruptured, melted, absorbed into the rubber composition or absorbed by the lubricant itself or by the lubricant diffusing through the shell wall during the expansion and contraction of the bladder at an elevated temperature as it is being "worked" during the rubber product (e.g. tire) curing operation. The expandable curing bladder thereby has a coating on its surface delivered by the release of the micro-encapsulated lubricant from its micro-encapsulation and its migration to the surface of the expandable curing bladder. It is to be appreciated that a portion of the lubricant is expected to be released from its micro-encapsulation during the high shear processing of the rubber composition in the preparation of the expandable curing bladder itself.

It is envisioned that the micro-encapsulated lubricant which is relatively incompatible with the butyl rubber composition of the expandable curing bladder, upon being released from the micro-capsule as the bladder is being worked, and the released lubricant migrates to the surface of the expandable curing bladder and thereby promotes a self-releasing property to the curing bladder surface. It is envisioned that the lubrication effect is further enhanced when the bladder rubber composition also contains one or more of castor oil, corn oil, graphite, polytetrafluoroethylene and UHMWPE or their mixtures, which also migrate(s) to the bladder surface to aid in providing the surface of the bladder with a low coefficient of friction. Unlike externally applied polysiloxane-based bladder lubricants, it is envisioned herein that low friction characteristic derived from the micro-encapsulated lubricant is maintained for a substantial portion of the useful life of the bladder without necessarily having to continuously externally apply a polysiloxane-based lubricant over the useful life of the bladder.

In a further aspect, it is seen herein that the micro-encapsulated polysiloxane-based lubricant is incompatible with the uncured diene-based elastomer rubber product (e.g. tire) such that the bladder does not tend adhere to or cure with the tire rubber during the tire curing process. Consequently, the application of externally applied bladder lubricants, such as silicone, or polysiloxane, polymers, may be significantly reduced or possibly eliminated.

Representative of various ultra high molecular weight polyethylene polymers (UHMWPE's) are, for example, those from the Ticona Company such as, for example, GUR 2122™, GUR 2126™, GUR 4120™ and GUR 4186™ reportedly having melting points in a range of from about 130° C. to about 135° C.

Representative of various lubricants are, for example polysiloxane lubricants such as, for example, polyalkylsiloxanes such as, also for example, poly(dimethylsiloxanes, such as, for example, DC200™ from the Dow Corning Company and Dimethyl Silicones™ from the Clearco Products Company.

Conventional preferred butyl rubbers for use in this invention are typically copolymers of isobutylene and a minor amount of a conjugated diene such as, for example, isoprene. Desirably, the isoprene component is from about 0.1 to about 5, alternately from about 0.5 to about 5, weight percent of units of the isobutylene copolymer rubber derived from isoprene, with the remainder being derived from the isobutylene.

An alternative butyl rubber for the curing bladder, although less preferable, is comprised of a brominated copolymer of isobutylene and paramethyl styrene. The brominated copolymer conventionally contains from about 0.3 to about 2 weight percent bromination. Exemplary of such a brominated copolymer is EXXPRO® from ExxonMobil Chemical reportedly having a Mooney (ML 1+8) viscosity at 125° C. of from about 45 to about 55, a para-methylstyrene content of about 5 weight percent, isobutylene content of about 94 to about 95 weight percent, and a bromine content of about 0.8 weight percent A European patent application having Publication No. 0,344,021 describes how to make such copolymers. Alternately, the butyl rubber may be comprised of a combination of a copolymer of isobutylene and isoprene together with a brominated copolymer of isobutylene and paramethyl styrene.

It is to be appreciated that the butyl rubber composition for the curing bladder (e.g. tire curing bladder) is resin-cured instead of sulfur-cured, which is a conventional practice for butyl rubber-based curing bladders which are used for rubber products composed of diene-based elastomers. As hereinbefore mentioned, the resin curatives are conventionally composed of a small amount of polychloroprene rubber, which is sometimes referred to as a "chloroprene rubber" and acts as a chlorine source, and a phenol-formaldehyde resin. Such resin cure system for butyl rubber is well known to those having skill in such art.

In practice, the polychloroprene rubber co-curative is conventionally counted toward the 100 parts by weight rubber of the butyl rubber composition even though it has a separate function as a halogen containing elastomer. It may be included in, amounts, for example, of up to 10 or even 15 weight percent of the butyl rubber when a halogen source is desirable to activate the resin cure system. In an exemplary embodiment, the butyl rubber composition comprises about 1 to about 10 phr of polychloroprene rubber, such as Neoprene® from DuPont.

Resins for curing the butyl rubber-based rubber composition of the curing bladder may be used in amounts, for example, of from about 1 to about 12 phr and include conventional phenol-formaldehyde resins. Such cure systems for bladder compositions are well known to those having skill in the art. For an example, see U.S. Pat. Nos. 3,031,423 and 5,728,311.

The cured butyl rubber-based rubber composition for the curing bladder may also contain conventional additives including fillers, stearic acid, resin for curing, antiozonants, antioxidants, processing oils, activators, initiators, plasticizers, waxes, extender oils and the like.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Antidegradants include antioxidants and antiozonants. Amounts used may be, for example, from about 0.1 to about 10 phr, although more typically about 2 to about 5 phr. Antiozonants are compounds that prevent chain scission due to exposure to ozone. They are also well known to the art. Antidegradants include monophenols, bisphenols, thiophenols, polyphenols, hydroquinone derivatives, phosphites, phosphate blends, thioesters, naphthylamines, diphenol amines as well as other diaryl amine derivatives, paraphenylenes, diamines, quinolines, and blended amines.

Various fillers are often incorporated into the curing bladder compositions. They may be used, for example, in amounts in a range of from about 20 to about 80 phr. A preferred filler is carbon black. Elastomer reinforcing type fillers are preferred for use in curing bladders. Silica may be used in a very minor amount in addition to the carbon black, if desired. Silicas are generally described as synthetic, amorphous silicas, particularly precipitated silicas. Fillers include reinforcing fillers such as carbon black which can be used, for example, in amounts from about 25 to about 75 phr. Typical carbon blacks that can be used include, for example, according to standard ASTM designations, acetylene black (e.g., N990), N110, N121, N220, N231, N234, N242, N293, N299, N326, N330, N332, N339, N343, N347, N351, N358, N375, N472, N539, N550, N683, N754, and N765, although acetylene black and N347 and/or N220 carbon blacks are usually preferred. Acetylene-derived carbon blacks typically have a higher thermal conductivity than more conventional rubber reinforcing carbon blacks and therefore typically constitute a major amount, and may sometimes constitute the total amount, of the carbon black reinforcement for the curing bladder composition.

Various oils and waxes may be used in the curing bladder butyl rubber-based composition, other than the aforesaid lubricants, depending upon the compatibility of such oils and waxes with the butyl rubber and the other components of the rubber formulation. They may be uniformly dispersed or they may desirably tend to phase separate (migrate to the surface) from the composition. Waxes include microcrystalline wax and paraffin wax. Oils include aliphatic-naphthenic aromatic resins, polyethylene glycol, petroleum oils, ester plasticizers, vulcanized vegetable oils, phenolic resin, polymeric esters and rosins. Waxes can be used in conventional individual amounts of, for example, from about 1 to about 5 or even up to about 10 phr. They are usually considered plasticizers and modulus modifiers. Fatty acids such as stearic acid, palmitic acid and oleic acid may be used in amounts of 0.1 to about 7 phr with a range of about 0.2 to about 6 phr sometimes being more preferred. Zinc oxide may be present, for example, in amounts of about 2 to about 15 phr.

As hereinbefore discussed, fluorinated ethylene polymers (PFE) may also be included in the composition. Such PFE's may be selected, for example, from the representative and illustrative group of polymers including homopolymers and copolymers of fluorinated ethylene monomers selected from the group consisting of tetrafluoroethylene, vinyl fluoride, vinylidene fluoride, trifluoroethylene, and chloro trifluoroethylene. The preferred polymers are polytetrafluoroethylene (PTFE) and copolymers of tetrafluoroethylene and one or more of the above stated fluorinated ethylene monomers with PTFE being the most preferred. The fluorinated ethylene polymers desirably have greater than 50, 75, 85 or 95 percent repeat units having one or more fluorine atoms. The PFE polymers of particular utilities are particulate PFE's having particle sizes of 1 to about 25 $\mu$m, preferably 1 to about 10 $\mu$m and most preferably less than 6 $\mu$m. Other particle sizes are useable. However, the small particle size PFE's are preferred because the smaller particles disperse better during the rubber mixing processes. The fluorinated ethylene polymers are desirably present from about 0.5 or 1 to about 10 or 30 phr, more desirably from about 4 to about 10 or 15 phr.

The PFE's may be fibrillated or non-fibrillated. Thus, the particulate fluorinated ethylene polymers may be converted to fibers during compounding of the rubber. One such particulate PFE is Polymist® F-5A from Ausimont of Morristown, N.J., U.S.A. However, other similar particulate PFE's can be utilized with equal advantage including those available from Dupont, such as Teflon®. When a polymer is recited as consisting essentially of tetrafluoroethylene repeat units herein it is meant that the polymer behaves as polymers from tetrafluoroethylene do in the composition even though trace amounts of initiator and chain transfer molecule fragments and/or other monomers may be present.

PFE compatibilizers known to the art may be used in these compositions or they may be excluded. They may be fluorine containing organic surfactants such as fluorocarbon surfactants from 3M Company named Fluorad® FC430. 3M characterizes their surfactant as a non-ionic surfactant of a fluorinated alkyl ester being 100 percent active and having a Brookfield viscosity at 25° C., spindle No. 3 at 6 rpm of 15,000 centipoise, a specific gravity of 1.15 at 25° C., a refractive index of 1.445 at 25° C., and a flash point above about 150° C.

Other suitable PFE compatibilizers include Solsperse® 13940, which is distributed in the U.S. by ICI Americas Incorporated of Wilmington, Del. This material is described in material safety data sheets as a water-soluble liquid consisting of 40 percent polymeric fatty ester and 60 percent paraffinic solvent having a boiling point of 240 to about 260° C. and a specific gravity of about 0.84.

As hereinbefore discussed, graphite may be included in the rubber composition to modify the properties of the bladder, if desired. The graphite is desirably used in amounts from about 0.1 to about 20 phr, more desirably from about 0.5 to about 15 phr, and preferably from about 0.5 or 1 to about 5, 10, or 15 phr. Alternatively, molybdenum disulfide and/or tungsten disulfide can be partially or fully substituted for the amount of graphite. PFE, graphite, molybdenum disulfide and tungsten disulfide may also be used in combination.

The graphite that is desirably incorporated into the curing bladders may be natural or synthetic. The graphite is added during mixing of the bladder formulation and is, therefore, dispersed throughout the molded bladder. Natural graphite can be found in Madagascar, Ceylon, Mexico, Korea, Australia, the Russian Federation, and China. Synthetic graphite can be made from carbonaceous material such as by heating petroleum coke to approximately 3000° C. in an electric resistance furnace. A preferred graphite (to aid in uniform dispersion) is a powdery form such that greater than 80 weight percent of the graphite passes through a 325 mesh U.S. Standard screen, more desirably greater than 90 weight percent and preferably greater than 99 weight percent passes through said screen mesh.

As hereinbefore discussed, various polysiloxane lubricants may be used for the for the micro-capsules, particularly poly(alkylsiloxanes) such as, for example, poly(dimethylsiloxanes).

The rubber composition for the tire cure bladder may be prepared, for example by mixing, in an internal rubber mixer, sometimes referred to as a first, or non-productive mixing stage, the rubber, micro-encapsulated lubricant, and ingredients such as for example, wax, zinc oxide and optionally particulate fluorinated ethylene polymers, and optionally graphite, until the mix temperature reaches a temperature in a range of from, for example, 150° C. to about 180° C. The material is dumped from the rubber mixer and milled on an open roll mill, sheeted off and cooled to a temperature below 40° C. The cooled rubber composition is added to an internal rubber mixer in a second mixing stage. In the second mixing stage (the productive stage), the curatives (including any neoprene rubber, resin, preferably brominated phenolic resin, and zinc oxide) were added and mixed until the mix temperature reaches, for example, about 110 to about 120° C. The material is then dumped from the internal rubber mixer and cooled.

The curing bladder may be molded, for example, in an injection molding machine or a transfer molding machine. If transfer molding is selected, the material obtained from the internal rubber mixer is extruded as a slug. A cure rheometer may be used to determine the approximate time to develop optimal cure at specific temperatures. The actual cure time will depend on heating rate and the gauge (thickness) of the curing bladder. The curing bladder desirably will have a toroidal shape. For example, bladder material may be cured for about 25 to about 35 minutes at a temperature of from, for example, 150° C. to about 190° C.

While the curing bladders of this invention are seen as being useful for molding and curing various pneumatic tires other contemplated rubber products cured in such bladder equipped presses include, for example, hoses, various sleeves, and air springs (a shock absorbing spring for commercial vehicles).

The following Example is provided to further exemplify prospective butyl rubber compositions for curing bladders of this invention. The parts and percentages are by weight unless otherwise provided.

EXAMPLE I

Exemplary Samples of butyl rubber-based rubber compositions for an expandable tire curing bladder are illustrated.

Samples A, B, C and D contain a dispersion of capsules of encapsulated polysiloxane lubricant.

Sample A also contains castor oil. Sample B also contains corn oil. Sample C also contains graphite and polytetrafluoroethylene. Sample D also contains an ultra high molecular weight polyethylene (UHMWPE).

The exemplary Samples are shown in the following Table 1. A process of preparing the Samples is illustrated by blending the ingredients in an internal rubber mixer using two separate stages of addition of the ingredients, namely, a first, non-productive, mix stage followed by a second, productive, mix stage where the curative(s) are added.

For the first, or non-productive internal mixing stage, the ingredients are mixed for about 4 minutes to a drop temperature of about 177° C. and the recovered mixture allowed to cool to a temperature below 40° C. In the second or productive mixing stage, the curatives are added and mixed for about 2 minutes to a drop temperature of about 110° C.

In Table 1 the butyl rubber component is recited as being 95 parts to allow for the 5 parts of neoprene rubber in the curatives package so that the total rubber in the formulation adds up to 100 parts by weight.

TABLE 1

| Materials | Parts | | | |
|---|---|---|---|---|
| | Sample A | Sample B | Sample C | Sample D |
| Non-Productive Mixing (150° C.) | | | | |
| Butyl rubber[1] | 95 | 95 | 95 | 95 |
| Carbon black[2] | 50 | 50 | 50 | 50 |
| Fatty acid (primarily stearic acid) | 0.5 | 0.5 | 0.5 | 0.5 |
| Castor oil[3] | 6 | 0 | 0 | 0 |
| Corn oil[4] | 0 | 6 | 0 | 0 |
| Graphite[5] | 0 | 0 | 10 | 0 |
| Polytetrafluouroethylene[6] | 0 | 0 | 10 | 0 |
| UHMWPE[7] | 0 | 0 | 0 | 10 |
| Capsules of encapsulated lubricant[8] | 10 | 10 | 10 | 10 |
| Productive Mixing (110° C.) | | | | |
| Curative(s)[9] | 18.5 | 18.5 | 18.5 | 18.5 |

[1]Mixture of a butyl rubber as a copolymer of isobutylene and isoprene which contains about one weight percent units derived from isoprene from the ExxonMobil Company and a butyl rubber as a brominated copolymer of isobutylene and paramethyl styrene which contains about 5 weight percent units derived from paramethyl styrene as EXXPRO ™ from the ExxonMobil Company.
[2]ASTM N-550, an ASTM designation
[3]Castor Number One from CasChem Company
[4]Liquid corn oil from Archer Daniels Midland Company
[5]Graphite as Synthetic Graphite 442 ™ from the Dixon Ticonderoga Company
[6]Polytetrafluoroethylene as Polymist F5-A ™ from the Ausimont Company
[7]Ultra high molecular weight polyethylene as GUR4120 ™ from the Ticona Company
[8]Micro capsules of poly(dimethylsiloxane) lubricant micro-encapsulated in thin polyester shells having an average diameter in a range of from about 5 to about 150 microns.
[11]Curative package as phenolic resin as phenol formaldehyde (9 parts), zinc oxide (4.5 parts) and polychloroprene rubber (5 parts).

EXAMPLE II

A curing press for curing an uncured toroidally shaped pneumatic rubber tire is prepared which is comprised of a suitable metal curing mold and contains an expandable curing bladder of Example I to assist shaping and curing said pneumatic tire.

The expandable curing bladder is used in the curing mold to shape and cure a pneumatic tire in which an uncured toroidally shaped pneumatic rubber is inserted into the curing mold; the curing mold is closed and the expandable curing bladder is inflated to expand it outwardly against an inner surface of the uncured tire to force the tire against a mold surface of said curing mold; the uncured pneumatic rubber tire is cured and shaped within the curing mold at an elevated temperature in a range of about 140° C. to about 180° C.; the expandable curing bladder is deflated; and the resultant cured pneumatic rubber tire is removed from the curing mold and expandable curing bladder.

While certain representative embodiments and details have been shown for the purpose of illustrating the invention, it will be apparent to those skilled in this art that various changes and modifications may be made therein without departing from the spirit or scope of the invention.

What is claimed is:

1. An expandable curing bladder for use in curing rubber products is composed of a rubber composition comprised of, based on parts weight per 100 parts by weight rubber (phr):

(A) an isobutylene copolymer rubber selected from butyl rubber and/or halobutyl rubber, and (B) about 0.5 to about 40 phr of a dispersion contained therein of micro-capsules comprised of a micro-encapsulated lubricant;

wherein said butyl rubber is comprised of a copolymer of isobutylene and isoprene which contains from about 0.5 to about 5 weight percent units derived from isoprene;

wherein said halobutyl rubber is a halogenated butyl rubber which is comprised of a chlorinated or brominated copolymer of isobutylene and isoprene which contains from about 0.5 to about 5 weight percent units derived from isoprene; and wherein said micro-capsules are comprised of said lubricant which is micro-encapsulated within a thin walled shell of an organic polymer.

2. The expandable curing bladder of claim 1 wherein said lubricant is a polysiloxane.

3. The expandable curing bladder of claim 1 wherein said lubricant is a poly(dimethylsiloxane).

4. A curing press for curing an uncured toroidally shaped pneumatic rubber tire which contains said expandable curing bladder of claim 1 to assist shaping and curing said pneumatic tire.

5. A process of using said expandable curing bladder of claim 1 to shape and cure a pneumatic tire which comprises:

(A) inserting an uncured toroidally shaped pneumatic rubber tire into a curing mold having said expandable curing bladder positioned therein;

(B) closing said curing mold and inflating said expandable curing bladder to expand said expandable curing bladder outwardly against an inner surface of said uncured pneumatic rubber tire to force said uncured pneumatic tire against a mold surface of said curing mold;

(C) curing said uncured pneumatic rubber tire in said curing mold at an elevated temperature in a range of about 140° C. to about 180° C.;

(D) deflating said expandable curing bladder; and (E) removing the resultant cured pneumatic rubber tire from the curing mold and expandable curing bladder.

6. The expandable curing bladder of claim 1 wherein said thin walled shells have an average diameter in a range of from about 1 to about 500 microns.

7. The expandable curing bladder of claim 1 wherein the thin walls of said shells are comprised of an organic polymer selected from a polyamide, polyester, polyurethane or polyurea based composition.

8. The expandable curing bladder of claim 7 wherein said thin walls of said shells are comprised of a polyamide or polyester based composition.

9. The expandable curing bladder of claim 1 wherein the walls of said shells are comprised of a polymerization product of a diamine and diacid chloride.

10. The expandable curing bladder of claim 1 wherein the walls of said shells are comprised of a polymerization product of a bisphenol and diacid chloride.

11. The expandable curing bladder of claim 1 wherein the walls of said shells are comprised of a bisphenol and diisocyanate.

12. The expandable curing bladder of claim 1 wherein the walls of said shells are comprised of a polymerization product of a polyamine and a diisocyanate.

13. The expandable curing bladder of claim 1 wherein the butyl rubber for the expandable bladder is cured with at least one curative including from about 0.5 to about 12 phr of a combination of polychloroprene rubber and phenol-formaldehyde resin.

14. The expandable curing bladder of claim 1 wherein said bladder rubber composition contains about 2 to about 8 phr of at least one of castor oil, corn oil, soya-bean oil and paraffinic oil.

15. The expandable curing bladder of claim 1 wherein the bladder rubber composition contains about 0.1 to about 30 phr of graphite and/or polytetrafluoroethylene powder.

16. The expandable curing bladder of claim 1 wherein the bladder rubber composition contains about 1 to about 15 phr of an ultra high molecular weight polyethylene (UHMWPE) having a melting point in the range of about 125° C. to about 140° C.

17. The process of claim 5 wherein said encapsulated lubricant:

(A) is released from the micro-encapsulation shell by the shell wall being ruptured, melted, absorbed into the rubber composition or absorbed by the lubricant itself or by the lubricant diffusing through the shell wall during the expansion and contraction of the bladder at an elevated temperature as it is being worked, and the released lubricant (B) migrates to the surface of the expandable curing bladder to provide a coating of said lubricant on the curing bladder surface and thereby promote a self-releasing property to the curing bladder surface.

18. The expandable curing bladder of claim 1 having a coating of said lubricant on the surface thereof delivered by the release of said micro-encapsulated lubricant from its micro-encapsulation and its migration to the surface of the expandable curing bladder.

19. The curing press claim 4, wherein said expandable curing bladder has a coating of said lubricant on the surface thereof delivered by the release of said micro-encapsulated lubricant from its micro-encapsulation and its migration to the surface of the expandable curing bladder.

* * * * *